United States Patent [19]

Hyde et al.

[11] 3,739,795

[45] June 19, 1973

[54] METHOD AND APPARATUS FOR DETECTING AND CONTROLLING FOAMABILITY OF A LIQUID SYSTEM

[75] Inventors: James A. Hyde, Downers Grove; Roger W. Youngs, Hinsdale, both of Ill.

[73] Assignee: Nalco Chemical Company, Chicago, Ill.

[22] Filed: July 19, 1971

[21] Appl. No.: 163,714

[52] U.S. Cl. ............... 137/5, 137/88, 252/321, 252/361, 55/178
[51] Int. Cl. ........................................... B01d 19/04
[58] Field of Search ........................ 55/178; 73/60.1; 137/5, 88, 93; 159/DIG. 4; 195/107; 202/264; 203/20; 252/321, 349, 361; 204/195 R, 195 G

[56] References Cited
UNITED STATES PATENTS

| | | | |
|---|---|---|---|
| 2,282,776 | 5/1942 | Gunderson | 252/361 X |
| 2,585,060 | 2/1952 | Wallace | 204/195 R |
| 3,154,577 | 10/1964 | Carter et al. | 252/361 X |
| 3,298,615 | 1/1967 | Echols | 252/361 X |
| 3,317,435 | 5/1967 | Yamashita et al. | 195/107 X |
| 3,401,065 | 9/1968 | Steinbrecher et al. | 204/195 R X |
| 3,404,063 | 10/1968 | Harding | 252/361 X |
| 3,425,952 | 2/1969 | Gaughan et al. | 159/DIG. 4 |
| 3,427,252 | 2/1969 | Gaughan et al. | 252/361 |
| 3,532,102 | 10/1970 | Glassey | 137/93 X |
| 3,554,212 | 1/1971 | Maroney | 137/93 |

FOREIGN PATENTS OR APPLICATIONS 144,456  3/1962  U.S.S.R. ............... 195/107

*Primary Examiner*—Alan Cohan
*Attorney*—Lloyd L. Zickert, John G. Premo and Charles W. Connors

[57] ABSTRACT

A method of automatically detecting and controlling foamability of a liquid system, wherein conductivity probes measure foaming to automatically control the introduction of antifoam into the system, and thereby control the foamability of the liquid system. In one arrangement foaming is measured externally by feeding a split stream from the system to a vessel where foaming is synthetically generated. In another arrangement, foaming is measured directly. Apparatus for carrying out the method where foaming is generated externally includes a vessel having means for synthetically causing foaming of the liquid to simulate the foaming normally encountered in the system. A split stream is suitably taken from the system and delivered to the vessel. The foamability of the liquid is then measured in the vessel to control means for feeding a given dosage of antifoam to the liquid system, and thereby control the foamability of the system. The magnitude of foaming is measured electrically to produce a signal for driving an antifoam feed control.

6 Claims, 9 Drawing Figures

Inventors
JAMES A. HYDE
ROGER W. YOUNGS
By Kinzer, Dorn & Zickert
Attorneys

Patented June 19, 1973  3,739,795

Inventors
JAMES A. HYDE
ROGER W. YOUNGS
By Kinger, Dow & Zickert
Attorneys

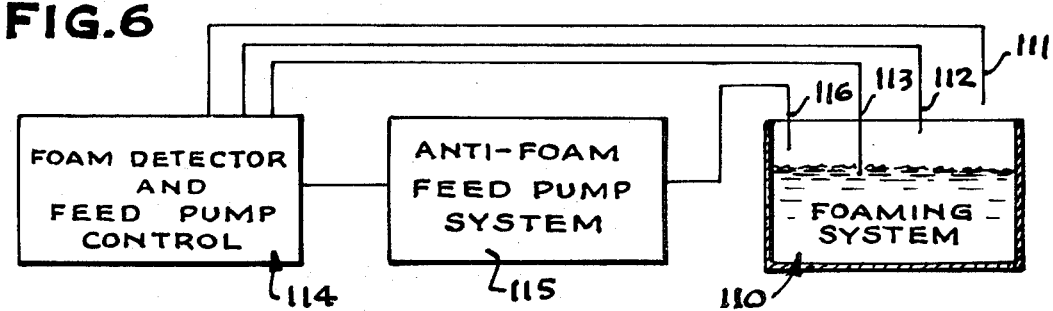
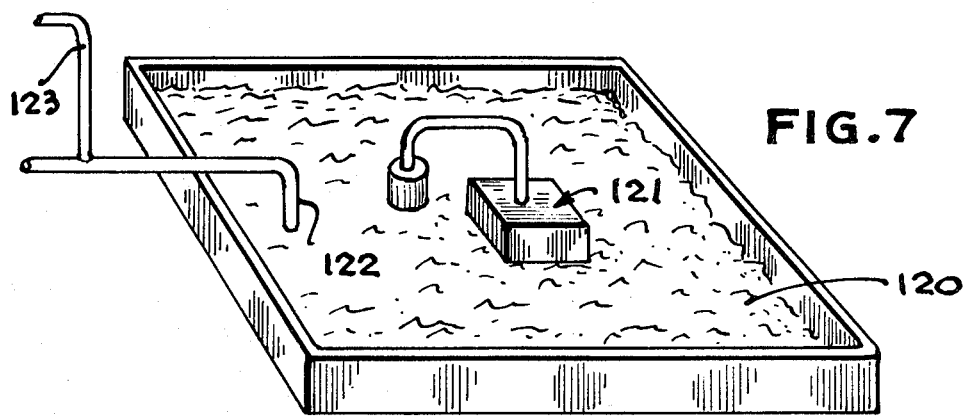
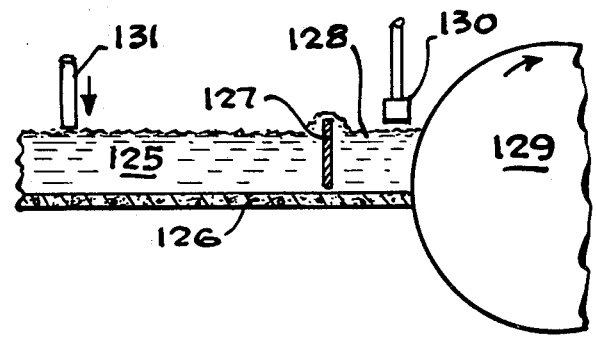
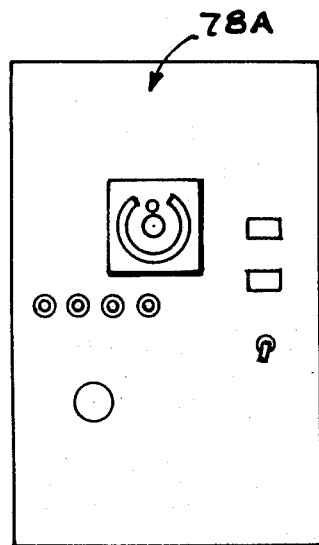
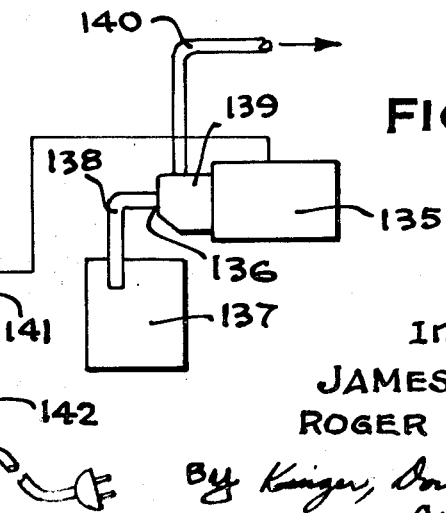

METHOD AND APPARATUS FOR DETECTING AND CONTROLLING FOAMABILITY OF A LIQUID SYSTEM

The present invention relates in general to a method and apparatus for detecting and controlling foamability of a system, and more particularly to a method and apparatus for detecting and controlling foamability in aqueous systems, and still more particularly to a method and apparatus for measuring foamability of a liquid system and automatically feeding the necessary amount of antifoam in order to maintain foamability of the system within desired parameters.

It has been common for liquid systems, such as an aqueous system employed in a paper mill processing plant, to use antifoams for controlling the foamability of the system and maintaining the foamability within desired limits. However, a considerable amount of antifoam wastage has been encountered since heretofore the antifoam has been added to the system manually, and only part of the time pursuant to manual foamability measurements. It is not possible to maintain continual operator surveillance over a liquid system to control the foamability without incurring wastage or inadequate control. Accordingly, some processors resort to using cheaper dosages of antifoam which actually do not accomplish the desired results. Due to the inability to control foamability, problems and malfunctioning are encountered in equipment of the system. Thus, controlling foamability of a liquid system without incurring wastage and excessive cost has become a problem.

The present invention solves the problem by providing a method and automatic apparatus for detecting and controlling foamability of a liquid system. The invention in one form includes taking a split stream from the system as a sample at a point where the liquid is being initially introduced into the system or at some other appropriate point, and simulating the foamation which the liquid undergoes during movement through and along the equipment of the system so that the foamability of the liquid in the system can be detectably measured, and steps can be taken to introduce the proper amounts of antifoam and thereby regulate the foamability of the system. The apparatus for synthetically causing foamation of the liquid externally of the system in one form includes a vessel into which a given flow of liquid from the system is introduced. The liquid flows past an air sparger or air dispersion tube which is powered by a given supply of compressed air, and which generates tiny air bubbles in the liquid. A liquid level is maintained above the air sparger, and the bubbles created rise to the surface of the liquid level and create foam. A drain line at or below the liquid level maintains the liquid level at a given point, and the foam generated above the liquid level is electrically measured by conductivity probes. In response to the measurement, suitablr apparatus is operated to feed a given amount of antifoam into the system, the apparatus being capable of increasing or decreasing the amount of antifoam to be added depending upon the need to maintain a desired foamability range in the liquid system. In another form foamation is measured directly in the system.

It is therefore an object of the present invention to provide a method and apparatus for measuring and controlling foamability of a liquid system, which includes taking a split stream of liquid from the system, synthetically subjecting it to conditions for producing foam equivalent to that which it would encounter in the system, measuring the foamability, and automatically delivering an antifoam to the system for controlling foamability.

A further object of the invention is to provide a method and apparatus for measuring and controlling foamability in a liquid system, which includes directly measuring foamation of the system and automatically feeding the necessary amount of antifoam into the system to maintain foamability within predetermined limits.

Another object of this invention is in the provision of a method and apparatus for measuring foamability in an aqueous or other liquid system, wherein high quality antifoam may be used without fear of wastage.

Other objects, features and advantages of the invention will be apparent from the following detailed disclosure, taken in conjunction with the accompanying sheet of drawings wherein like reference numerals refer to like parts, in which:

FIG. 6 is a block diagram of the present invention where direct measurement of the foaming system is achieved;

FIG. 7 is a somewhat perspective and diagrammatic view of a foaming system in the form of a pond and illustrating the manner in which a foam detector may be used to directly measure the foamation in the pond to thereby control an antifoam feed system for controlling foamability;

FIG. 8 is a somewhat diagrammatic view of a further arrangement where the present invention is employed wherein foamability is directly measured adjacent a washing wheel for a paper slurry in a paper mill; and FIG. 9 is a somewhat diagrammatic view of a further modified arrangement for feeding antifoam into a liquid system.

Figure 1:
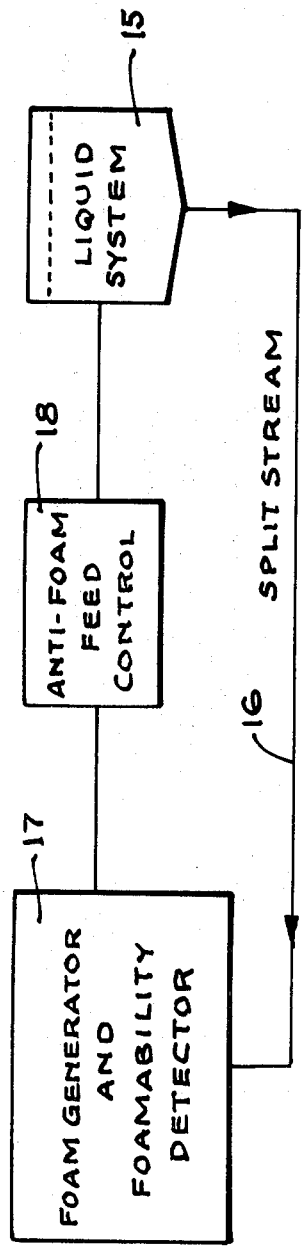
FIG. 1 is a block diagram depicting one form of the method and apparatus of the invention for measuring and controlling foamability of a liquid system.

Referring now to the drawings, and particularly to the block diagram of FIG. 1, a liquid system 15 is illustrated, wherein a split stream 16 is taken from the liquid system and delivered to a foam generator where the liquid is synthetically subjected to a process for causing it to foam to the extent that it would as it passes through the liquid system, and the foamability is measured by a foamability detector 17. It will be appreciated that the split stream is taken from a point in the system ahead of the areas in which the foaming is created, it being the intent to also introduce at this point the necessary antifoam to control the foamability of the liquid.

In a typical liquid system such as an aqueous system used in a paper mill processing plant, the foamability of the system varies, as the makeup of the liquid stock varies, and therefore the same amount of antifoam cannot be introduced during the entire operation of the system without incurring substantial waste of antifoam, which wastage increases the cost of the overall process.

The foamability detector portion, measuring the foamability of the liquid, actuates an antifoam feed control 18 which feeds the required amount of antifoam into the system 15 to control foamability. Since the foamability is automatically controlled, on a continuing basis, in response to the foamability detector, the antifoam feed control may be increasing, decreasing, or completely omitting an antifoam dosage to the system. The foamability is detected by probes which electrically measure the height of the foam synthetically produced.

Figure 2:
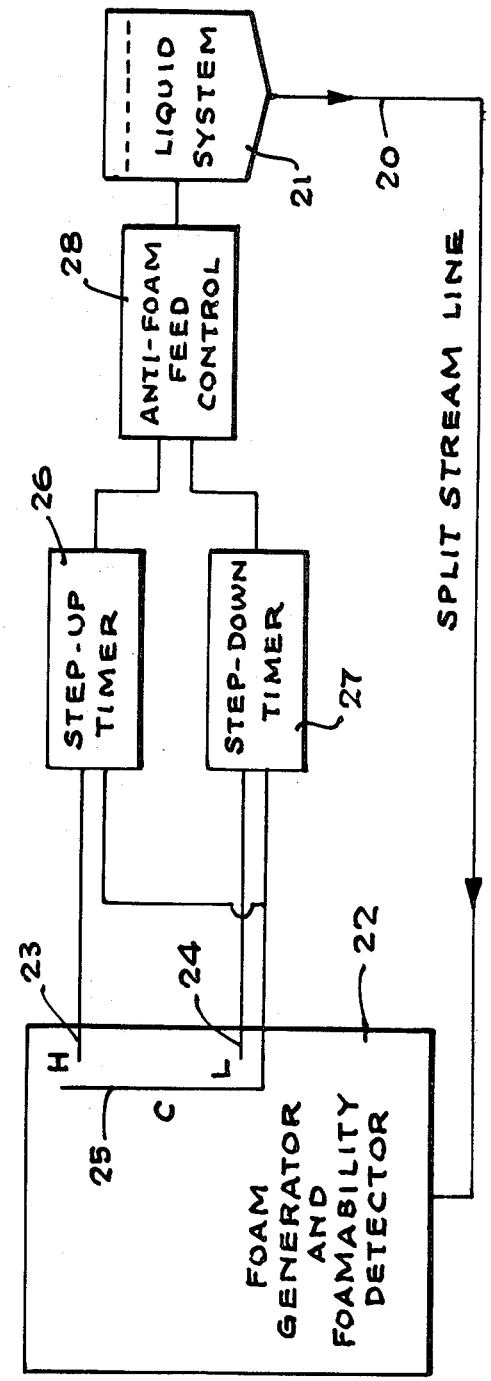
FIG. 2 is a block diagram illustrating a further embodiment.

The antifoam feed control 18 in the system shown in FIG. 1 may operate simply to increase or decrease the dosage of antifoam to the liquid system depending upon the level of foam generated and detected in the foam generator and foamability detector 17. Another form of antifoam feed control is illustrated in the embodiment of FIG. 2, wherein a split stream 20 of liquid is taken from the liquid system 21 and delivered to the foam generator and foamability detector 22. The foamability detector includes conductivity probes for detecting the level of foam generated above the liquid level, wherein an upper electrode 23 and a lower electrode 24 coact with a common electrode 25. The upper level electrode or high electrode, together with the common electrode feeds a signal when covered with foam to a step-up timer 26, while the lower electrode 24 representing a low level when uncovered, sends a signal to the step-down timer 27. The outputs of the timers control the antifoam feed control 28 which injects antifoam into the liquid system 21. The step-up timer 26, the step-down timer 27 and the antifoam feed control 28 essentially comprise control means for converting the intelligence of the electrodes 23, 24 and 25 to a signal for controlling the addition of antifoam into the liquid system 21. This includes standard commercially available components such as conductivity bridges, sometimes referred to as resistance amplifiers, of a type made and sold under Model LCS-1 by Curtis Development and Manufacturing Co. of Milwaukee, Wisconsin, together with add/subtract stepping relays, Model PAS made and sold by Guardian Electrical Manufacturing Co. of Chicago, Illinois.

In oepration, when the foam level covers both the low and high electrodes, the step-up timer is activated to periodically incrementally increase the antifoam dosage to the liquid system to decrease foamability. Should the high electrode subsequently be uncovered, it will cause deactivation of the step-up timer 26 to thereby maintain whatever rate of antifoam feed that was established prior to uncovering and thereby hold the defoaming of the system at a constant level. Thus, when the foam level is between the high and low conductivity electrodes, the antifoam dosage will remain constant. Should the low electrode become uncovered, it will activate the step-down timer 27 to periodically and incrementally decrease the antifoam dosage, even to the point of completely stopping the antifoam dosage in the event that the foam level remains below the lower electrode. In the event that the lower electrode thereafter becomes covered, whatever dosage feed has been established by the feed control 28 will remain constant.

Figure 3:
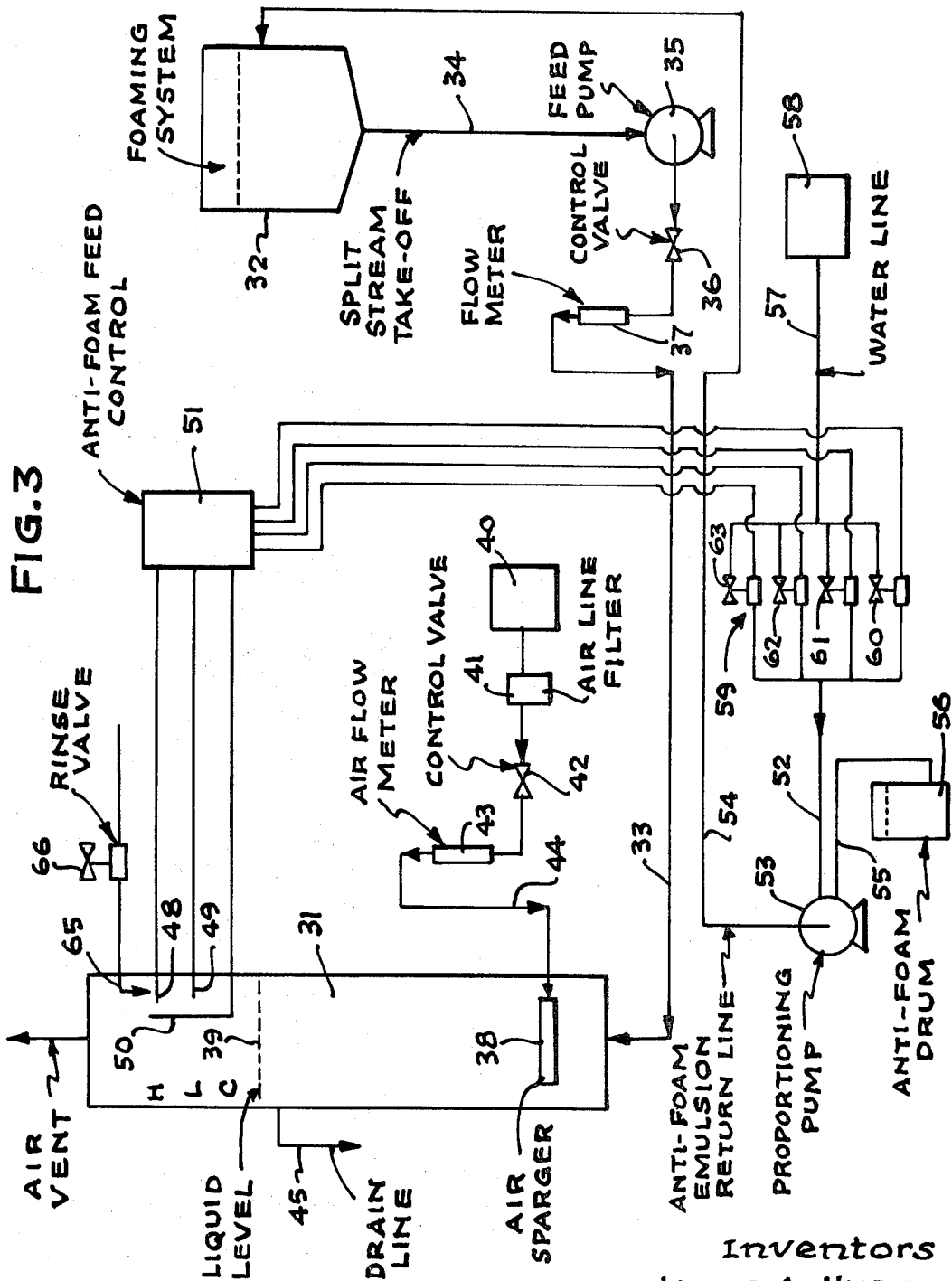
FIG. 3 is a further block diagram illustrating in more detail the apparatus and method of the invention.

Referring now to the block diagram of FIG. 3, further details of the invention are shown, this diagram illustrating controls for regulating antifoam feed and for creating foam in the foam generator. The foam generator and foamability detector 31 has a split stream of liquid from the liquid system 32 delivered through a line 33. A split stream is taken from the liquid system through line 34 by a pump 35 which pumps the liquid through a control valve 36 and a flow meter 37, and to the lower end of the foam generator vessel 31. The control valve controls the amount of liquid delivered to the foam generator vessel 31.

As the liquid enters the vessel, it goes past an air sparger 38 which functions to generate small air bubbles that rise to the liquid level 39 and form foam thereabove. The air sparger is powered by a source of compressed air 40 which delivers the air through an air line filter 41, a control valve 42, an air flow meter 43, the line 44, and to the sparger. Depending upon the desired amount of bubble generation by the air sparger, the amount of air delivered thereto may be varied by the control valve 42.

The drain line 45, positioned below the liquid level 39, maintains the liquid level at a given point, and therefore its drainage capacity is related to the volume of liquid delivered to the vessel. The liquid level must be maintained above the drain line so that foam above the liquid level is not pulled down the drain.

The foamability detector includes a conductivity probe arrangement for detecting the height of the foam above the liquid level, and is of the same type as illustrated in FIG. 2, in that it includes a high level electrode 48, a low level electrode 49, and a common electrode 50, all of which are connected into the antifoam feed control 51. The antifoam feed control 51 would include the same components for converting the intelligence of the foamability detector into antifoam dosages for the liquid system as indentified in connection with the embodiment of FIG. 2 wherein conductivity bridges and stepping relays would be provided.

Antifoam is fed to the liquid system 32 by means of a proportioning pump 53 through a line 54. The intake line 52 of the pump 53 inlcudes an antifoam line 55 connected to an antifoam source 56, and a water line 57 connected to a source of water 58 through a volumetric control 59. The volumetric control 59 includes a plurality of solenoid controlled valves 60, 61, 62 and 63, each of which permit a certain volume of water to pass therethrough. For example, each valve may allow the passage of 1 gallon per minute flow, regardless of water pressure, wherein if all valves are open, a 4-gallon per minute flow is delivered to the proportioning pump 53. It therefore becomes apparent that the amount of antifoam delivered by the proportioning pump 53 depends upon volumetric control 59. The amount of antifoam pulled thorugh the pump 53 increases as the volumetric rate of water in line 57 increases. Accordingly, the antifoam feed control 51 will operate the volumetric control 59 in accordance with the needs established by the foamability detector.

Inasmuch as conductivity probes 48, 49 and 50 may become contaminated with usage, it is necessary to periodically clean the electrodes, and in this connection, a water rising nozzle 65 is positioned within the vessel to rinse probes when the solenoid electrode rinse valve 66 is opened. The rinse valve will be opened periodically, and during the rinse procedure, the electrodes will be deactivated so as to eliminate any readings by the antifoam feed control.

Figure 4:
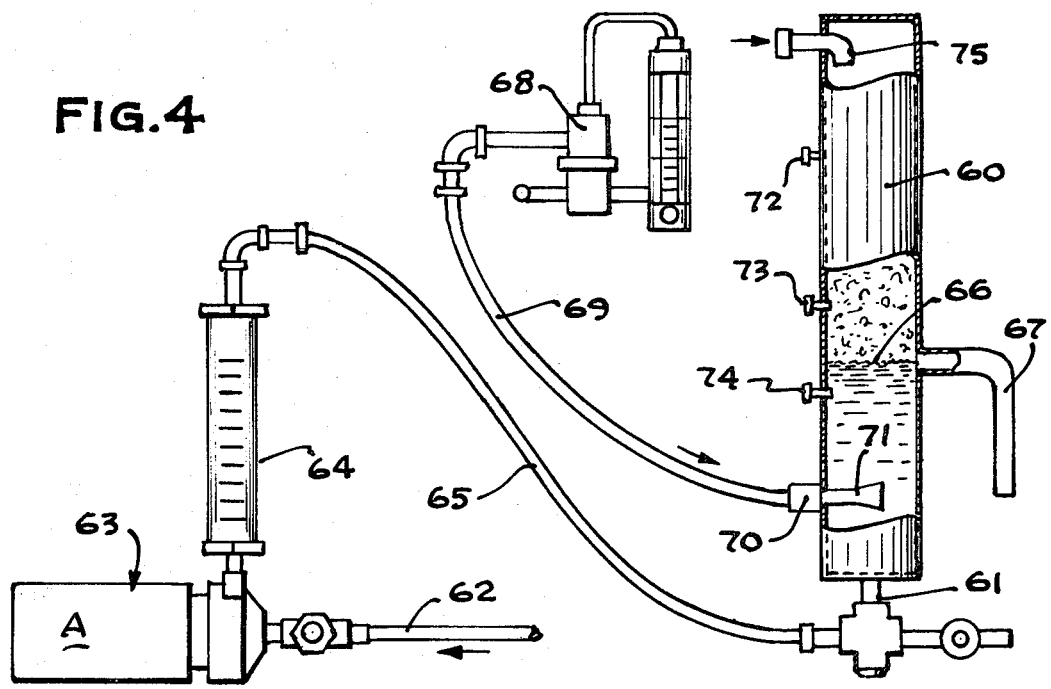
FIG. 4 is a somewhat diagrammatic view illustrating another version of the external foam generation equipment that may be employed when taking a split stream from a liquid system.

Another form of the external foam generating apparatus is illustrated in FIG. 4, which includes a vessel 60 into which liquid from the foaming system is pumped through the inlet 61 at the bottom of the vessel. A split stream is taken from the foam system through a pipe 62 which is connected to the suction side of a column feed pump 63. The discharge side of the pump is connected to a flow meter 64 which is in turn connected to the vessel inlet 61 through a pipe 65. A column 66 of liquid is maintained in the vessel at a predetermined level by the column feed pump 63 and a drain line 67. The pump 63 is electrically driven and controlled at a panel as to its speed to deliver the desired amount of liquid into the vessel.

Compressed air is delivered through an air flow regulator 68 and a pipe 69 to an inlet 70 of an air dispersion tube 71, the latter of which is located within the vessel at a point below the top level of the liquid column 66. The air flow regulator 68 maintains a constant flow rate at the air discharge tube 71 to disperse the air within the liquid and form air bubbles which rise to the surface and produce foamation in a simulated fashion to that which would be generated in the liquid system from which the split stream is taken.

Foamability detection is achieved by a high level electrode 72, a low level electrode 73, and a common electrode 74. The common electrode 74 is positioned below the top level of the liquid column to always assure electrical contact, while the upper and lower electrodes are positioned at predetermined points above the column level. An electrode rinse nozzle 75 is suitably connected to a valve and a supply of clear water to be actuated periodically for rinsing contaminants from the high and low level electrodes.

Figure 5:
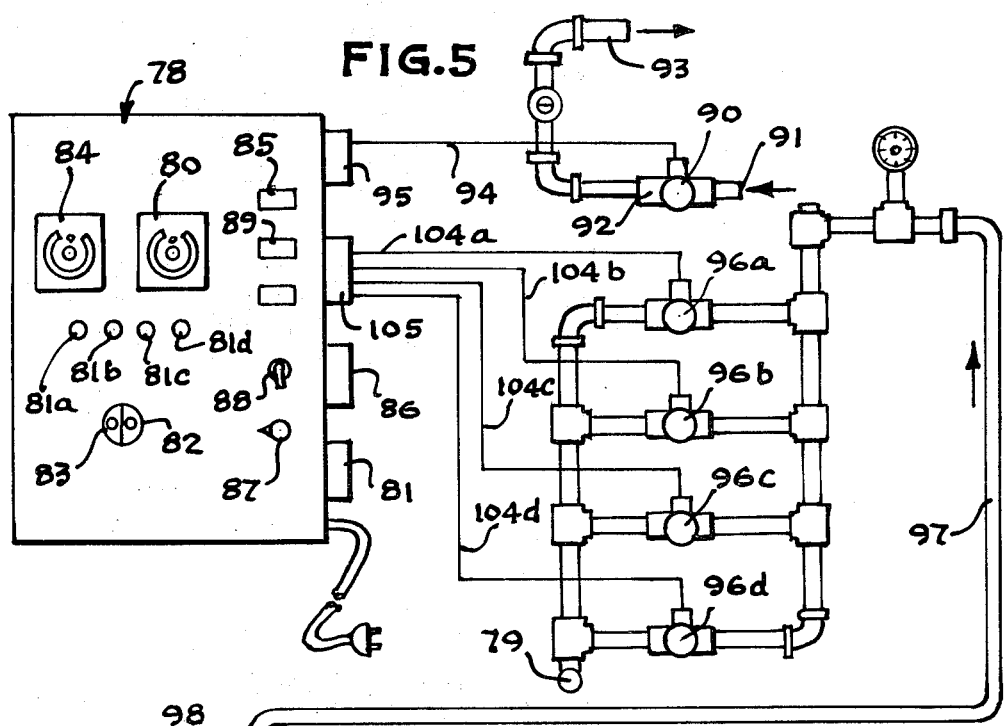
FIG. 5 is a somewhat diagrammatic view of another form of antifoam feed control arrangement for the present invention.

Referring now to FIG. 5, an antifoam feed control similar to that earlier referred to is illustrated wherein a control box 78 receives as an input a signal from the foamability detector and controls in response thereto the amount of antifoam introduced into the system through pipe 79. The control box includes an antifoam lag timer 80 responding to the foamability detector which is connected into the plug 81 to increase, decrease or maintain the antifoam treatment level. Pilot lights 81a, 81b, 81c and 81d are energized depending upon the antifoaming treatment level established within the control box. Pilot lights 82 and 83 respectively indicate the need to increase or decrease the treatment level in response to the foamability detection signal. A rinse timer 84 may be adjustably set to control rinsing of the electrodes on the detector and a rinse pilot light 85 indicates when the rinsing cycle is in progress. A column feed pump, such as that shown in FIG. 4, may be plugged into plug 86 to obtain power which may be variably adjusted pursuant to the variable speed control 87 by adjusting the voltage to the pump. In the event that the control box is used where no external foam generation is needed, the variable speed control 87 may be omitted. A main On-Off switch 88 controls overall energization of the control box and a pilot light 89 indicates whe the power is ON.

The rinse timer 84 controls a solenoid valve 90 having its inlet 91 connected to a fresh water supply and its outlet 92 connected to the rinse line 93. The solenoid valve 90 is operated through an electric line 94 connected into the plug 95 of the control box.

Antifoam dosage is controlled through the operation of a plurality of solenoid valves 96a, 96b, 96c and 96d having their inlets connected to a line 97 that comes off the discharge 98 of a hydraulically operated proportioning pump 99. A water supply line 100 providing water at a constant pressure is connected to the suction 101 of the pump 99. The pump 99 may be of any suitable type of water driven proportioning pump, such as one made by Crownco. Also connected to the suction side of the pump is an antifoam line 102 that leads from an antifoam drum or supply 103 wherein a constant amount of antifoam is mixed into the water which is discharged from the pump 99 into the water and antifoam line 97. The outlet sides of the solenoid valves 96 are connected to the pipe 79 which feeds the antifoam dosage to the foaming system. Lines 104a, 104b, 104c and 104d electrically connect the solenoid valves 96 to the control box 78 through a plug 105. The water pressure in line 100 drives the pump 99 which mixes the water and antifoam that is delivered to the inlets of the solenoid control valves 96. Depending upon the signal from the foam detector, one or any combination of two or more of the solenoid valves 96 will be opened to provide the desired amount of antifoam dosage to the foaming system. It should be recognized that the arrangement in FIG. 5 may be employed to automatically control antifoam dosage to a liquid system where the foam is externally generated and detected, or where the foamability is directly detected in the system.

As above mentioned, the method and apparatus of the present invention encompasses direct foamation detection in a foaming system and which is illustrated in block form in FIG. 6, wherein the foaming system 110 has a detector including a high level probe 111, a low level probe 112, and a common probe 113, which coact to detect foamability and drive a foam detector and feed pump control 114. The control 114 operates an antifoam feed pump system 115 for applying a proper antifoam treatment through a line 116 into the foaming system. As illustrated in FIG. 6, the probes are vertically arranged as opposed to being horizontally arranged, as shown in FIG. 4, it being appreciated that they may be arranged in either position depending upon the installation. Further, in the vertical position it may not be necessary to apply a rinse to the probes. The antifoam feed pump system 115 may be of the type illustrated in FIG. 5 wherein the treatment dosage includes a mixture of antifoam and water, or it may be of the type where antifoam is directly injected into the foaming system.

An example for use of the present invention is shown in FIG. 7 where a pond 120 forms the foaming system where it is desired to have foamability control. Such a pond might be out in the open and it would be desirous of maintaining the height of foam on top of the liquid system at a minimum in order to avoid dissemination of the foam over the countryside in the event of high winds. Here the foam height on the top of the liquid system would be directly measured by a foam detector 121 that would be positioned at a desired location on the pond, such as adjacent to the inlet pipe 122. It should be appreciated that the foam detector may have a floating support so that it could be moved from one location to another tethered in position. Antifoam may be injected into the inlet pipe 122 through an antifoam line 123. It should be recognized that a mixture of antifoam and water or clear antifoam could be injected into the system through line 123. Further, the foam detector 121 would be associated with a control which would, in turn, provide the measured amount of antifoam for the system.

Another example of directly detecting foamation in a foaming system is illustrated in FIG. 8 in association with a paper washing process for a paper mill. A slurry 125 is delivered along a trough 126 over a weir 127 and into a chamber 128 at a washing roller 129. The roller is foraminous to allow water passage. The slurry is picked up by the washing roller surface and water is pulled from the slurry through the roller surface as it is transferred around to another washing stage or for other processing. A foam detector 130 is arranged at the chamber 128 for detecting the foaming of the system ahead of the washing roller. The detector then, as in the other embodiments, operates a control which actuates an antifoam feed system to deliver antifoam through a pipe 131 into the slurry 125 upstream from the weir 127. Accordingly, the foamability at the washing roller 129 will be controlled automatically.

A modification is illustrated in FIG. 9 wherein a variable speed antifoam pump 135 is illustrated for feeding undiluted or diluted antifoam dosages directly into a liquid system, it being appreciated that this could be done instead of mixing the antifoam with water such as by the embodiment of FIG. 5. Thus, the antifoam feed pump system of this embodiment merely includes the pump 135 having a suction 136 connected to a supply of antifoam 137 through a line 138 and a discharge 139 connected to a line 140 which is, in turn, directed into the liquid system. The pump 135 is driven by a direct current variable speed electrical motor, and is operated by a control box 78A in response to the signal generated by the conductivity electrodes. The pump is electrically connected to a control box plug 141 while the conductivity electrodes are electrically connected to a control box plug 142. Otherwise the control box is the same as control box 78 above-described with the exception that the rinse timer and pilot lights have been omitted since this is an optional feature and not always needed. Further, the variable speed control for the column feed pump is not needed where the foam is measured directly from the liquid foaming system. The operation of the control box is otherwise the same wherein an increase, decrease, or maintaining of the antifoam dosage is achieved in response to the signal from the conductivity electrodes. This arrangement eliminates the hydraulically operated proportioning pump. However, it should be appreciated that where it is desired or needed, this arrangement may be used where external foam generation is achieved.

It should further be appreciated that the foam level detector may take other forms than that shown, such as where a differential conductivity measurement is taken by a pair of electrodes that are of the same length and terminate at the same level with respect to the level of the liquid system. Thus, in place of the direct On and Off signals that would be produced by the electrode arrangements shown in FIGS. 2, 3, 4 and 6, a continuous signal in accordance with differential conductivity measurements could serve to operate the control box and control foamability of the system.

It will be understood that modifications and variations may be effected without departing from the scope of the novel concepts of the present invention, but it is understood that this application is to be limited only by the scope of the appended claims.

We claim:

1. A method of detecting and controlling foamability of a liquid system, comprising the steps of continuously taking a split stream of liquid from the system at a given rate and feeding same to a vessel, maintaining the liquid level substantially constant, synthetically causing foaming of the liquid in the vessel, continuously detecting the foamability of the split stream by use of a plurality of conductivity probes arranged at different heights within the vessel, and continuously feeding a predetermined amount of antifoam to the system in response to the detection step to control the foamability of the system.

2. Apparatus for detecting foamability of a liquid system and feeding antifoam thereto to maintain a predetermined foamability of the system, said apparatus comprising, means for synthetically causing foaming of the liquid including a vessel in which foam generation takes place, means continuously taking a split stream of liquid from the system at a predetermined rate and delivering same to said vessel, means for maintaining the liquid level in the vessel substantially constant, conductivity probe means in the vessel for continuously detecting the height of foam generated, and means responsive to the detecting means for automatically adding a predetermined amount of antifoam to the system to control foamability thereof.

3. Apparatus as defined in claim 2, wherein said means causing the synthetic foaming of the liquid in the vessel includes an air sparger.

4. In a liquid system susceptible to foaming, apparatus for detecting foamability and automatically feeding antifoam into the system at a rate to control foaming therein, said apparatus comprising a vessel, means feeding a split stream of liquid from the system into the bottom of the vessel, means in the vessel for synthetically generating a foam on the liquid level level of substantially the same intensity as would be generated in the system, means maintaining the liquid level substantially constant, means in the vessel above the liquid level measuring the height of the foam including a plurality of conductivity electrodes arranged at different heights, a supply of antifoam, means for injecting variable dosages of antifoam into the system, and antifoam feed control means responsive to the measured height of the foam in the vessel for controlling the injecting means.

5. The combination as defined in claim 4, wherein said foam measuring means includes high and low conductivity electrodes, and said antifoam feed control means responding to covering of the high electrode to periodically incrementally increase the antifoam dosage, while uncovering of said low electrode causes the antifoam control means to periodically incrementally decrease the antifoam dosage.

6. The combination as defined in claim 5, and means for periodically rinsing the electrodes.

* * * * *